United States Patent [19]

McGough John G.

[11] Patent Number: 4,769,759

[45] Date of Patent: Sep. 6, 1988

[54] METHOD FOR DEVELOPING AIR DATA FOR USE IN FLIGHT CONTROL SYSTEMS

[75] Inventor: McGough John G., Ridgewood, N.J.

[73] Assignee: Allied-Signal Inc., Morris Township, Morris County, N.J.

[21] Appl. No.: 874,761

[22] Filed: Jun. 16, 1986

[51] Int. Cl.⁴ .............................................. G06F 15/50
[52] U.S. Cl. .................................. 364/435; 364/434; 244/181
[58] Field of Search ............... 364/434, 453, 435, 559, 364/565, 566; 244/178, 177, 181

[56] References Cited

U.S. PATENT DOCUMENTS

| | | | |
|---|---|---|---|
| 4,106,094 | 8/1978 | Land | 364/453 |
| 4,212,443 | 7/1980 | Duncan et al. | 364/453 X |
| 4,222,272 | 9/1980 | Mairson | 364/565 |
| 4,254,465 | 3/1981 | Land | 244/175 X |
| 4,303,978 | 12/1981 | Shaw et al. | 364/453 |
| 4,608,641 | 8/1986 | Snell | 364/434 |

Primary Examiner—Parshotam S. Lall
Assistant Examiner—Black Thomas G.
Attorney, Agent, or Firm—Anibal J. Cortina; Howard G. Massung

[57] ABSTRACT

A method for developing desired air data for use in flight control systems is disclosed including determining angle of attack and sideslip angle relative to inertial space and also determining said angles by solving appropriate aerodynamic equations, whereby two independent estimates of the angles are provided. These estimates are combined for providing the desired data.

9 Claims, 3 Drawing Sheets

METHOD FOR DEVELOPING AIR DATA FOR USE IN FLIGHT CONTROL SYSTEMS

BACKGROUND OF THE INVENTION

Digital Flight Control Systems for current and future generation high performance fighter aircraft require highly precise air data i.e., angle of attack and sideslip angle, for closed loop control of aircraft attitude and flight path. Conventional equipment used to provide these data has several disadvantages, among which are the following:

(1) heating is required for de-icing probes that measure pressures;
(2) extensive pneumatic plumbing is required;
(3) measurements can be adversely affected by engine power changes;
(4) external probes and in-flight damage and create aerodynamic drag; and
(5) pressure measurements tend to be inaccurate at high frequencies, i.e. during flight maneuvers or in the wake of another aircraft.

Accordingly, it is the object of the present invention to provide a method for developing the required air data which obviates these disadvantages.

In order to satisfy the aforenoted object of the invention, angle of attack and sideslip angle are first developed relative to inertial space and then in accordance with aerodynamic force equations. The data so developed are blended so that the data developed relative to inertial space are used at high frequencies such as occur during the aforenoted flight maneuvers or in the wake of another aircraft, and the data developed in accordance with aerodynamic force equations are used at low frequencies.

SUMMARY OF THE INVENTION

This invention contemplates a method for developing desired air data for use in flight control systems including determining angle of attack and sideslip angle relative to inertial space. For a known trim condition, trim angle of attack and trim sideslip angle are obtained from a table of prestored values as functions of dynamic pressure, mach number and aircraft gross weight. Using these values and an estimate of true airspeed, true airspeed is resolved along fixed aircraft axes to obtain the components of true airspeed in trim. While still in trim the gravity vector of the aircraft is approximated at a particular instant in time. Having thus established the gravity vector, the Eulerian angles ($\phi$, $\theta$, $\psi$) are determined. Fundamental expressions for inertial accelerations are thereafter determined, from which estimates of total angles of attack and sideslip are developed.

Angle of attack and sideslip angle are also determined independently by directly solving appropriate aerodynamic force equations. Trim angle of attack and trim sideslip angle are determined as aforenoted and fundamental expressions for inertial accelerations are provided, from which estimates of total angles of attack and sideslip are developed.

It will be recognized from the above that essentially two independent estimates of angle of attack and sideslip angle are provided. These estimates are combined via a complementary filter arrangement to provide the desired data for the purposes described.

DETAILED DESCRIPTION OF THE INVENTION

In describing the invention the following definitions will be used:

(x, y, z) = Body-fixed coordinates
($a_x$, $a_y$, $a_z$) = Components of inertial acceleration at center of gravity (CG)
($a_{xm}$, $a_{ym}$, $a_{zm}$) = Components of measured acceleration at CG
(P, Q, R) = Angular rates about x, y, z aircraft-fixed axes
($\Delta x_a$, $\Delta y_a$, $\Delta z_a$) = Distance from accelerometers to CG
(U, V, W) = Components of inertial velocity
($U_o$, $V_o$, $W_o$) = Components of inertial velocity in trim
($U_a$, $V_a$, $W_a$) = Components of true airspeed
($U^o_a$, $V^o_a$, $W^o_a$) = Components of true airspeed in trim
(u, v, w,) = Components of incremental inertial velocity
($\delta a$, $\delta r$, $\delta e$) = Aileron, Rudder, Elevator Displacements
($u_a$, $v_a$, $w_a$) = Components of incremental airspeed
($u_g$, $v_g$, $w_g$) = Components of wind gust
$\alpha$ = Angle of attack
$\beta$ = Angle of sideslip
$\Delta_\alpha$ = Incremental angle of attack
$\Delta_\beta$ = Incremental angle of sideslip
$\alpha_{TRIM}$ = Trim angle of attack
$\beta_{TRIM}$ = Trim sideslip angle
M = Mach number
$M_{\delta e}$ Aerodynamic moment derivative with $\delta_e$
q = Dynamic pressure
m = Aircraft mass
W = Aircraft gross weight
$I_{yy}$ = Aircraft moment of inertia
$C_L$ = Aerodynamic lift coefficient
$C_D$ = Aerodynamic drag coefficient
$C_{m\delta e}$ = Change in pitching moment with $\delta_e$
($\phi$, $\theta$, $\psi$) = Eulerian angles
T = Total thrust
($T_x$, $T_y$, $T_z$) = Components of thrust
($\Delta T_x$, $\Delta T_y$, $\Delta T_z$) = Components of incremental thrust
G = Gravitational Constant
TAS = True Airspeed
TEMP. = Free-Air Temperature (°F. abs)
S = Aircraft wing area
c = Mean aerodynamic chord
$P_s$ = Static Pressure In determining angle of attack and sideslip angle relative to inertial space three orthogonally disposed accelerometers and three orthogonally disposed rate gyros as primary instruments and an external air temperature sensor, a fuel flow meter and a static pressure sensor as secondary instruments are used.

From these instruments estimates of the following auxiliary variables are made, as will be hereinafter decribed:

$\alpha_{TRIM}$ and $\beta_{TRIM}$;
dynamic pressure, q;
aircraft gross weight, W;
mach number, M;
true airspeed, TAS;
aircraft moment of inertia, $I_{yy}$;
CG location;
$M_{\delta e}$; and
z-component of thrust, $T_z$.

In addition, this approach requires the following aerodynamic data:

$C_L$, $C_D$ (for $\alpha_{TRIM}$, $\beta_{TRIM}$ estimates); and
$C_{m\delta e}$ (for $M_{\delta e}$ estimate)

Figure 1:
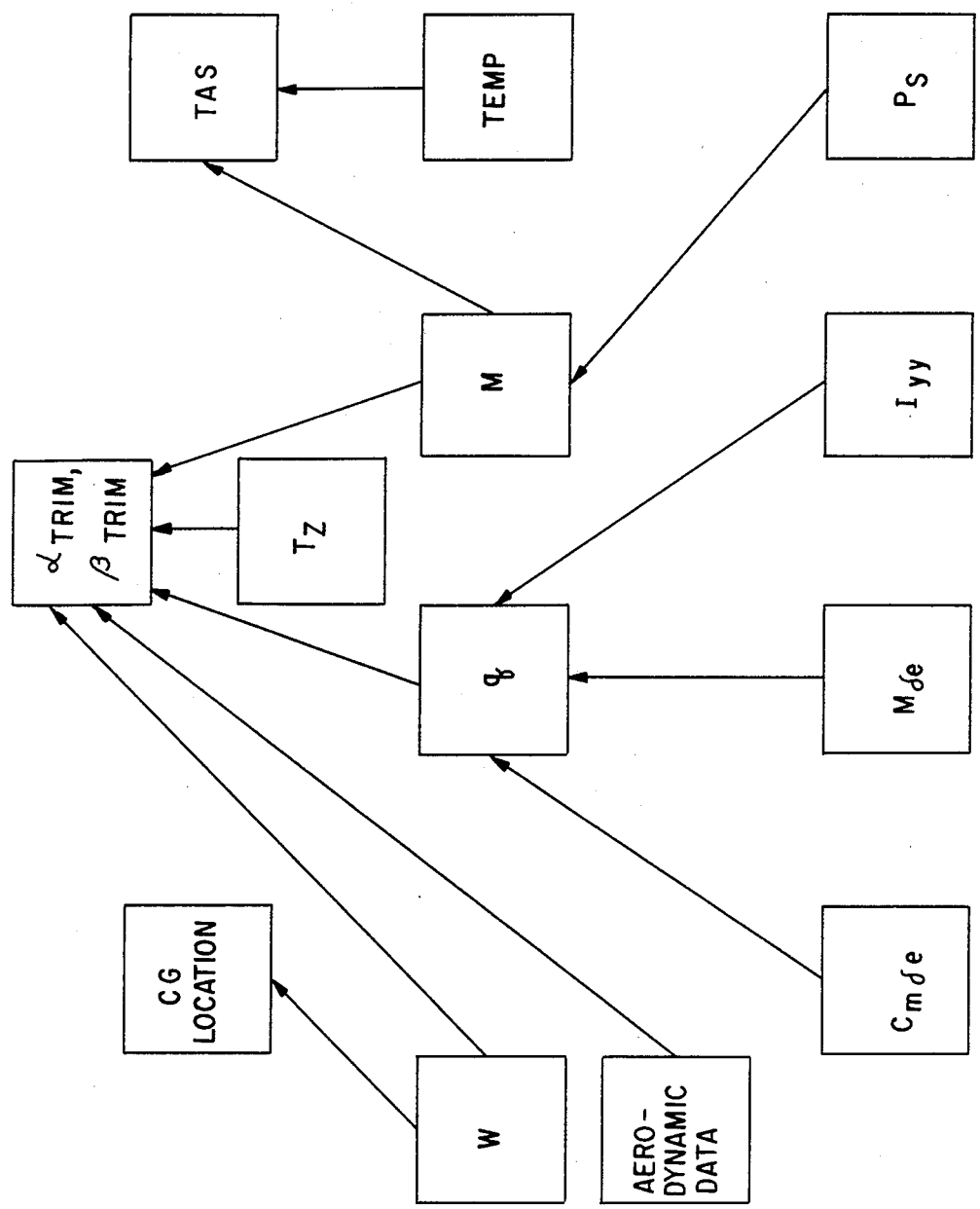
FIG. 1 is a flow diagram illustrating the dependencies of auxiliary variables and aerodynamic data when determining estimates of angle of attack and sideslip angle relative to inertial space.

The dependencies of the above auxiliary variables and aerodynamic data are shown in the flow diagram of FIG. 1. In determining angles of attack and sideslip by solving aerodynamic force equations, three orthogonally disposed accelerometers and three orthogonally disposed rate gyros (optional) as primary instruments and a fuel flow meter and a static pressure sensor as secondary instruments are used. From these instruments estimates of the following auxiliary variables are made; as will be hereinafter described:

$\alpha_{TRIM}$ and $\beta_{TRIM}$;
dynamic pressure, q:
aircraft gross weight, W;
mach number, M;
aircraft moment of inertia, $I_{yy}$;
CG location;
$M_{\delta e}$;
z-component of thrust, $T_z$; and
incremental thrust, $\Delta T_x$, $\Delta T_y$, $\Delta T_z$.

In addition, this approach requires the following aerodynamic data:

$C_L$, $C_D$ (for $\alpha_{TRIM}$, $\beta_{TRIM}$ estimates);
aerodynamic derivatives associated with the lift, side-force and drag equations; and
$C_{m\delta e}$ (for $M_{\delta e}$ estimate).

Figure 2:
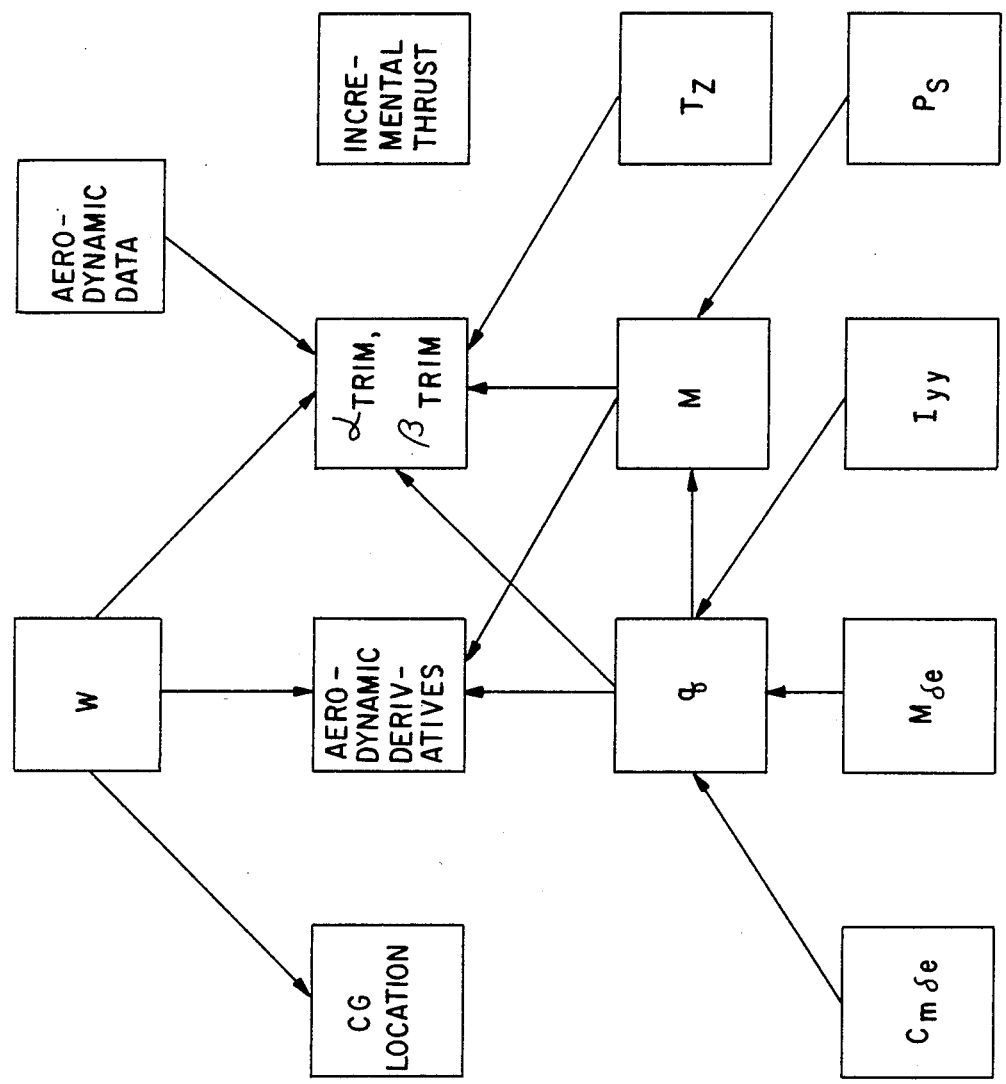
FIG. 2 is a flow diagram illustrating the dependencies of auxiliary variables and aerodynamic data when determining estimates of angle of attack and sideslip angle by solving aerodynamic force equations.

The dependencies of the above auxiliary and aerodynamic data are shown in the flow diagram of FIG. 2.

In determining angles of attack and sideslip relative to inertial space, $\alpha_{TRIM}$ and $\beta_{TRIM}$ are obtained for a known trim condition from tabulated values as functions of q, M and W. Using these values and an estimate of TAS, TAS is resolved along the aircraft fixed axes to obtain $U^o_a$, $V^o_a$, $W^o_a$. While still in trim the gravity vector is approximated by:

$$(a_{xm}, a_{ym}, a_{zm}),$$

at the instant of time when:

$$a^2_{xm} + a^2_{ym} + a^2_{zm} = G^2 \quad (1)$$

or equivalently, when $$(a_x + G \sin \theta_o)^2 + (a_y - G \sin \phi_o \cdot \cos \theta_o)^2 + (a_z - G \cos\phi_o \cdot \cos \theta_o)^2 = G^2. \quad (2)$$

(1) insures that the magnitude of the estimated gravity vector equals G. Thus, the error in the estimation is $(a_x, a_y, a_z)$, the components of which must satisfy (2). It is considered that the imposition of (1) will greatly reduce the error in the estimated gravity vector.

Having thus established the gravity vector, the Eulerian angles $\phi_o$, $\theta_o$ are computed from:

$$G \sin \theta_o = a_{xm}; \text{ and}$$

$$-G \sin \phi_o \cdot \cos \theta_o = a_{ym}.$$

Thereafter, inertial accelerations are estimated from:

$$a_x = a_{xm} - G \sin \theta;$$

$$a_y = a_{ym} + G \sin \phi \cdot \cos \theta; \text{ and}$$

$$a_z = a_{zm} + G \cos \phi \cdot \cos \theta;$$

where, initially, $\phi = \phi_o$ and $\theta = \theta_o$.

The next trim condition is assumed to occur whenever:

$$a_x = a_y = a_z = 0, \text{ (approximately); and}$$

$$P = Q = R = 0, \text{ (approximately)}.$$

The fundamental equations thus established are then:

$$a_x = \dot{U} + QW - RV;$$

$$a_y = \dot{V} + RU = PW; \text{ and}$$

$$a_z = \dot{W} + PV - QU.$$

Further:

$$\dot{\phi} = P + Q \sin \phi \tan \theta + R \cos \phi \tan \theta;$$

$$\dot{\theta} = Q \cos \phi - R \sin \phi; \text{ and}$$

$$\dot{\psi} = (Q \sin \phi + R \cos\phi)/\cos \theta;$$

with initial conditions:

$$P = Q = R = 0;$$

$$(U, V, W) = (U^o_a, V^o_a, W^o_a); \text{ and}$$

$$\phi = \phi_o$$

$$\theta = \theta_o$$

$$\psi = 0.$$

By means of these equations the incremental velocities, u, v, w are determined. Total angle of attack and sideslip angle are then developed from:

$$\alpha = \tan^{-1} \frac{W_a^o + w}{U_a^o + u} ; \text{ and}$$

$$\beta = \sin^{-1} \frac{V_a^o + v}{[(U_a^o + u)^2 + (V_a^o + v)^2 + (W_a^o + w)^2]^{\frac{1}{2}}} .$$

In developing angles of attack and sideslip by solving aerodynamic force equations, said angles are determined by directly solving said aerodynamic equations and using accelerometer readings. The trim values $\alpha_{TRIM}$, $\beta_{TRIM}$ are estimated from tabulated values for a known trim condition as functions of q, M and W as heretofore described. Fundamental equations are then established as:

$$a_{xm} - a_{xm}(o) = a_x + G\sin\theta - G\sin\theta_o =$$
$$X_u u_a + X_v v_a + X_w w_a + \frac{\Delta T_x}{m} +$$
$$[X_p P + X_Q Q + X_R R + X_w \dot{w}];$$

$$a_{ym} - a_{ym}(o) = a_y - G\sin\phi \cdot \cos\theta + G\sin\phi_o \cdot \cos\theta_o =$$
$$Y_u u_a + Y_v v_a + Y_w w_a + Y_{\delta a}\delta a + Y_{\delta r}\delta r +$$
$$\frac{\Delta T_y}{m} + [Y_p P + Y_Q Q + Y_R R + Y_v^\bullet \dot{v}]; \text{ and}$$

$$a_{zm} - a_{zm}(o) = a_z - G\cos\phi \cdot \cos\theta + G\cos\phi_o \cdot \cos\theta_o =$$
$$Z_u u_a + Z_v v_a + Z_w w_a + Z_{\delta e}\delta e + \frac{\Delta T_z}{m} +$$
$$[Z_p P + Z_Q Q + Z_R R + Z_w^\bullet \dot{w}].$$

The bracketed terms are only included if optional rate gyros are used. If said rate gyros are not available, the bracketed terms represent error terms.

It is noted that the Eulerian angles $\phi$, $\phi_o$, $\theta$, $\theta_o$ are implicit in the acclerometer readings, and consequently, do not have to be determined, as is the case when the angle of attack and sideslip angle are determined relative to inertial space as heretofore described.

Total angle of attack and sideslip angle are determined from:

$$\alpha = \tan^{-1}\frac{W_a^o + w_a}{U_a^o + u_a};$$

$$\beta = \sin^{-1}\frac{(V_a^o + v_a)}{[(U_a^o + u_a)^2 + (V_a^o + v_a)^2 + (W_a^o + w_a)^2]^{\frac{1}{2}}};$$

where, $U^o_a, V^o_a, W^o_a$ = components of TAS in trim.

It is possible to eliminate the dependence on TAS by rewriting the fundamental equations in terms of the quantities:

$$\frac{u_a}{U_a^o}, \frac{v_a}{U_a^o}, \frac{w_a}{W_a^o}.$$

In this case, angles of attack and sideslip are determined from:

$$\Delta\alpha = \frac{w_a}{U_a^o}, \alpha = \alpha_{TRIM} + \Delta\alpha$$

$$\Delta\beta = \frac{v_a}{U_a^o}, \beta = \beta_{TRIM} + \Delta\beta.$$

The dependencies among the auxiliary variables shown in FIG. 2 assume that the dependence on TAS has been eliminated, i.e., the equations are solved for:

$$\frac{u_a}{U_a^o}, \frac{v_a}{U_a^o}, \frac{w_a}{U_a^o}.$$

It is noted that, since the aerodynamic derivatives are proportional to q, the use of the fundamental equations require a continuous update of at least q and most likely Mach number.

Figure 3:
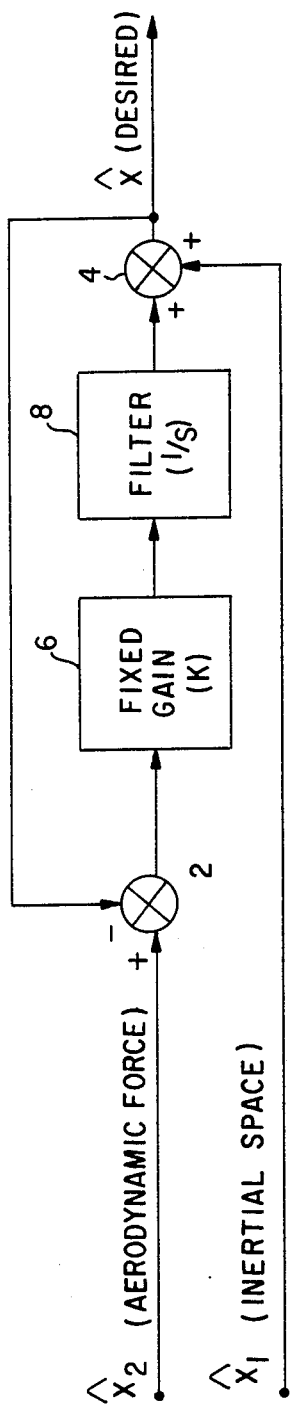
FIG. 3 is a block diagram illustrating a complementary filter in accordance with the invention.

In accordance with the aforegoing, essentially two independent estimates of $\alpha$ and $\beta$ are developed. This suggests that the respective estimates of $\alpha$ and $\beta$ could be combined to yield more accurate estimates than could be obtained from either estimate alone. This is accomplished by a complementary filter arrangement as shown in FIG. 3.

In this connection it is noted that when determining angles of attack and sideslip relative to inertial space, a principal error source is the change in wind from a trim condition. In fact, it is easily shown that the resultant error in $\Delta\alpha$, for example, is:

$$w_g/U^o_a,$$

where, $w_g$ = change in wind velocity along the z-aircraft axis
$U^o_a$ = true airspeed along the x-aircraft axis.

At low airspeeds and wind changes in the order of, for example, 40 ft/sec. the resultant errors are unacceptable. Since large amplitude wind changes occur essentially at low flight frequencies, and since developing angles of attack and sideslip by solving aerodynamic force equations is unaffected by wind, the complementary filter arrangement is designed to use the inertial space $\alpha$ and $\beta$ estimates at high frequencies and the aerodynamic force equation estimates of $\alpha$ and $\beta$ at low frequencies to provide desired estimates.

It is noted that the complementary filter arrangement does not introduce extraneous phase lag for any choice of filter time constant K, which allows greater flexibility in its selection. It has been found that for a variety of time constants in the range of K=1 second, acceptable results have been obtained.

With reference then to FIG. 3, estimates of angle of attack or sideslip angle relative to inertial space are designated as $\hat{x}_1$, and said estimates in accordance with the aerodynamic force equations are designated as $\hat{x}_2$.

$\hat{x}_2$ is applied to a summing means designated by the numeral 2 which algebraically sums $\hat{x}_2$ with the output of an adding means 4. The output of summing means 2 is applied to a gain device 6 having a fixed gain K. The output of gain device K is applied to a filter 8 having a time constant 1/s. The output from filter 8 is applied to adding means 4 and is added thereby with $\hat{x}_2$. Adding means 4 thereby provides an output $\hat{x}$ which is the desired estimate of $\alpha$ or $\beta$, as the case may be.

The dependencies among the auxiliary variables are shown in the flow diagrams of FIGS. 1 and 2 as aforenoted. Estimates of these variables are achieved as will next be described:

1. q Estimate

The procedure for estimating q is based on the observation that (a)

$$q = \frac{M_{\delta e} I_{yy}}{S\bar{c} C_{m\delta e}};$$

and (b) at high frequencies, the amplitude ratio $$|\dot{Q}/\delta e|$$

is approximately equal to $|M_{\delta e}|$.

Figure 4:
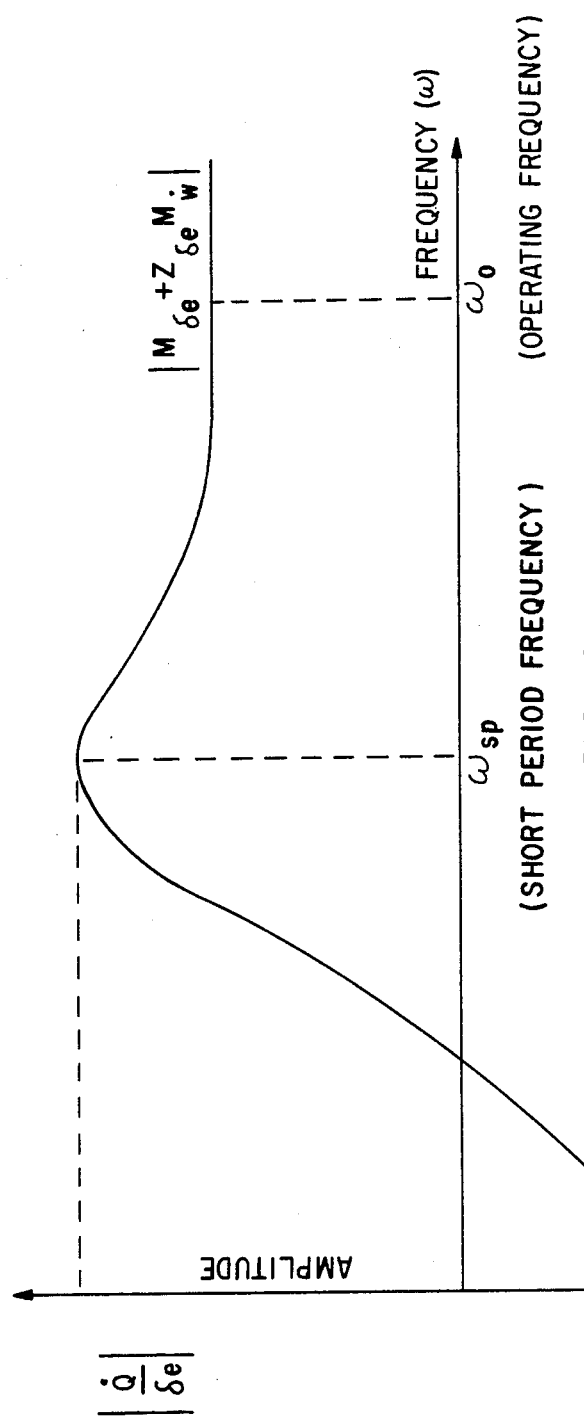
FIG. 4 is a graphical representation illustrating amplitude/frequency response when estimating dynamic pressure (q).

The estimating procedure consists of introducing an extraneous sinusoidal $\delta e$ command, approximating $|M_{\delta e}|$ by the amplitude of the resultant Q response and substituting this into (a) above to obtain q. A typical amplitude/frequency response is shown in FIG. 4. It is noted that, at high (operating) frequencies, the amplitude is actually equal to $$|M_{\delta e} + Z_{\delta e} M_w^*|.$$

In practice, however, the last term is negligible.

In practice, q can be estimated continuously or periodically, irrespective of the trim condition of the aircraft. Because a sinusoidal surface motion could be considered objectionable, it is preferable that q is estimated periodically and incremented between updates by using estimated airspeed and incremental inertial altitude.

2. Mach Number Estimate

Mach number is estimated from:

$$M = SQRT \frac{2}{1.4} * \frac{q}{P_s}$$

3. TAS Estimate

TAS is estimated from:

$$TAS = 49 \, M * SQRT \, (TEMP) \, (ft/sec).$$

4. W Estimate

The proposed method for estimating gross weight is to track fuel and stores, assuming that the initial weight is known.

5. $I_{yy}$ Estimate

It is assumed that $I_{yy}$ is a predictable function of gross weight. Thus if W is known, so is $I_{yy}$.

6. $P_s$ Estimate

For purposes of the present invention it is assumed that static pressure can be measured directly by an air data instrument. This is considered acceptable because such a sensor is relatively simple and need not project far into the airstream, as would be undesirable.

7. TEMP Estimate

For purposes of the present study it was assumed that free-air temperature (TEMP) would be measured directly.

8. CG Estimate

It is assumed that CG location is a predictable function of gross weight. Thus, if W is known so is CG location.

9. Thrust Estimates

Thrust is important because of its presence in the aerodynamic force equations. In particular, it affects the $\alpha_{TRIM}$ determination and the $\Delta\alpha$ determination as heretofore described.

For a conventional aircraft the thrust vector lies in the xz-plane and makes a fixed angle $\epsilon$ with the x-aircraft axis. If total thrust, T, is known then x and z components can be computed from $$T_x = T \cos \epsilon \text{ and}$$

$$T_z = T \sin \epsilon.$$

In the determination of $\alpha_{TRIM}$, T can be approximated by $$T \sim q \, S \, C_D;$$

and thus, $$T_z \sim q \, S \, C_D \sin \epsilon.$$

In non-trim flight, however, a drag equation is required for estimating $u_a$ if large airspeed changes are anticipated. Thus, an independent measurement of thrust is required in order to compute $\Delta T_x$ and $\Delta T_z$ in non-trim flight.

It is noted that if TAS were continuously available the incremental velocity component $u_a$ would be determined from $$U_a^o + u_a = TAS(t) \frac{W_a^o + w_a}{U_a^o + u_a} - U_a^o,$$

and substituted into the appropriate lift and sideforce equations. Then the drag equation could be used to compute total thrust (and the $T_z$ component).

With the above description of the invention in mind reference is made to the claims appended hereto for a definition of the scope of the invention.

What is claimed is:

1. A method for developing desired estimates of angle of attack and sideslip angle for controlling the flight of an aircraft, comprising the steps of:
    developing first estimates of angle of attack and sideslip angle relative to inertial space;
    developing second estimates of angle of attack and sideslip angle based on aerodynamic force relationships; and
    combining the first estimates and the second estimates for developing the desired estimates of angle of attack and sideslip angle and controlling the flight of the aircraft based on said desired estimates.

2. A method as described by claim 1, further comprising the steps of:
    combining the desired estimates with the second estimates for providing first combined estimates;
    applying a fixed gain to the first combined estimates;
    filtering the first combined estimates having the fixed gain applied thereto;
    combining the filtered, first combined estimates having the fixed gain applied thereto with the first estimates for providing second combined estimates, said second combined estimates being the desired estimates; and
    said desired estimates corresponding to the first estimates at relatively high aircraft flight frequencies and corresponding to the second estimates at relatively low aircraft flight frequencies.

3. A method as described by claim 2, wherein combining the desired estimates with the second estimates for providing the first combined estimates is comprised of:
    algebraically summing the desired estimates and the second estimates.

4. A method as described by claim 2, wherein combining the filtered, first combined estimates having the fixed gain applied thereto with the first estimates for providing the second combined estimates is comprised of:

adding the filtered, first combined estimate having the fixed gain applied thereto and the first estimates.

5. A method for developing desired estimates of angle of attack and sideslip angle for controlling the flight of an aircraft, comprising the steps of:

developing first estimates of angle of attack and sideslip angle relative to inertial space;

developing second estimates of angle of attack and sideslip angle based on aerodynamic force relationships; and combining the first and second estimates for developing the desired estimates of angle of attack and sideslip angle and controlling the flight of the aircraft so that the desired estimates correspond to the first estimates at relatively high aircraft flight frequencies and correspond to the second estimates at relatively low aircraft flight frequencies.

6. A method as described by claim 5, further comprising the steps of:

combining the desired estimates with the second estimates for providing first combined estimates;

applying a fixed gain to the first combined estimates;

filtering the first combined estimates having the fixed gain applied thereto; and combining the filtered, first combined estimates having the fixed gain applied thereto with the first estimates for providing second combined estimates, said second combined estimates being the desired estimate.

7. A method as described by claim 6, wherein combining the desired estimates with the second estimates for providing the first combined estimates is comprised of:

algebraically summing the desired estimates and the second estimates.

8. A method as described by claim 7, wherein combining the filtered, first combined estimates having the fixed gain applied thereto with the first estimates for providing the second combined estimates is comprised of:

adding the filtered, first combined estimates having the fixed gain applied thereto and the first estimates.

9. A method for developing desired estimates of angle of attack and sideslip angle for controlling the flight of an aircraft, comprising the steps of:

developing first estimates of angle of attack and sideslip angle relative to inertial space;

developing second estimates of angle of attack and sideslip angle based on aerodynamic force relationships;

algebraically summing the desired estimates and the second estimates for providing summed estimates;

applying a fixed gain to the summed estimates;

filtering the summed estimates having the fixed gain applied thereto;

adding the filtered, summed estimates having the fixed gain applied thereto to the first estimates for providing added estimates and controlling the flight of the aircraft based on said added estimates;

said added estimates being the desired estimates; and said desired estimates corresponding to the first estimates at relatively high aircraft flight frequencies and corresponding to the second estimates at relatively low aircraft flight frequencies.

* * * * *